(12) United States Patent
Watanabe et al.

(10) Patent No.: US 6,234,479 B1
(45) Date of Patent: May 22, 2001

(54) CONTROLLER FOR GAME MACHINES

(75) Inventors: Naoki Watanabe, Komae; Yoshihiro Mieda, Kawasaki; Kazuhiro Maeda, Yokohama, all of (JP)

(73) Assignee: Namco, LTD, Tokyo (JP)

( * ) Notice: Subject to any disclaimer, the term of this patent is extended or adjusted under 35 U.S.C. 154(b) by 0 days.

(21) Appl. No.: 09/331,207

(22) PCT Filed: Oct. 13, 1998

(86) PCT No.: PCT/JP98/04622

§ 371 Date: Jun. 11, 1999

§ 102(e) Date: Jun. 11, 1999

(87) PCT Pub. No.: WO99/19036

PCT Pub. Date: Apr. 22, 1999

(30) Foreign Application Priority Data

Oct. 14, 1997 (JP) .................................................... 9-280729

(51) Int. Cl.[7] ........................................................ A63F 9/14
(52) U.S. Cl. ............................ 273/148 B; 463/37; 463/46
(58) Field of Search ........................... 273/148 B; 463/36, 463/37, 46, 6; 434/62

(56) References Cited

U.S. PATENT DOCUMENTS

| | | | | |
|---|---|---|---|---|
| D. 410,255 | * | 5/1999 | Otomi et al. | 463/6 X |
| 4,892,312 | * | 1/1990 | Minemoto et al. | 273/148 B |
| 5,056,787 | * | 10/1991 | Mitsuyoshi | 273/148 B |
| 5,370,536 | * | 12/1994 | Chuang | 434/62 |
| 5,438,331 | * | 8/1995 | Gilligan et al. | 341/35 |
| 5,785,317 | * | 7/1998 | Sasaki | 273/148 B |
| 5,989,123 | * | 11/1999 | Tosaki et al. | 463/37 |
| 6,050,897 | * | 4/2000 | Suzuki et al. | 463/37 |

* cited by examiner

Primary Examiner—Raleigh W. Chiu
(74) Attorney, Agent, or Firm—Faegre & Benson LLP

(57) ABSTRACT

A controller main body 1 forms an input operating part having at least one disk shaped control plate 2, 2' mounted so as to be rotatable on axes 3 and 3' substantially perpendicular to the surface of the controller main body and having plate holding means 6, 7 and 6', 7' for holding the control plates at their neutral positions by their resilient force. The control plates rotate on their rotation axes so that prescribed switches 10, 11, 12 and 13 are turned on/off.

14 Claims, 8 Drawing Sheets

CONTROLLER FOR GAME MACHINES

TECHNICAL FIELD

The present invention relates to a controller for a game machine having an input operating part which can be operated by a player and most suitable for a domestic television game machine, a video game machine for a business or the like.

BACKGROUND

For instance, most of the controllers of domestic game machines have a plurality of switches such as four or more switches. They employ substantially a push-button type as an input type for turning on/off the switches.

PROBLEMS TO BE SOLVED BY THE INVENTION

In game machines sold in recent years, however, the contents thereof are changed in various ways and some games cannot preferably be met by a push-button type controller. For example, with a game in which switchers are turned on/off to music, it is difficult to match an operating sensation to the sense of pleasure of the game at its maximum when using the controller provided with the push-button type input operating part. Disadvantageously, the operating system thereof is poorly adapted to the game.

For overcoming the conventional problems as mentioned above, it is an object of the present invention to provide a controller for a game machine which is extremely suitable to some kinds of games which have been met by the conventional push-button type controller with difficulty.

DISCLOSURE OF THE INVENTION

In order to achieve the above mentioned object, according to the present invention, there is provided a controller for a game machine having an input operating part to be operated by a player, the controller having a controller main body forming the input operating part, the controller main body comprising:

at least one disk shaped control plate mounted so as to be rotatable on an axis substantially vertical to the surface of the controller main body and plate holding means for holding the control plate at its neutral position by resilient force, the control plate rotating on the rotation axis so that prescribed switches are turned on/off.

The controller main body forming the input operating part may comprise at least one disk shaped control plate mounted so as to be rotatable on an axis substantially vertical to the surface of the controller main body and the control plate may rotate on the rotation axis so that prescribed switches are turned on/off.

According to the present invention, the control plate may effectively rotate/reversibly rotate relative to the neutral position so that the respectively different switches are turned on/off.

Further, according to the present invention, the controller main body may be more effectively provided with at least two control plates which have the same size and the same shape and are arranged in parallel rightward and leftward of each other.

In the case of the above described construction, the switches operated by the rotating control plate may be push-button type switches or may be slide-contact type switches.

Particularly, in case the switches are the slide-contact type switches, they may be incremental switches.

The controller main body may be provided with operating members other than the control plate.

BEST MODES FOR CARRYING OUT THE INVENTION

Embodiments of the present invention will be described below by referring to the accompanying drawings.

Figure 1:
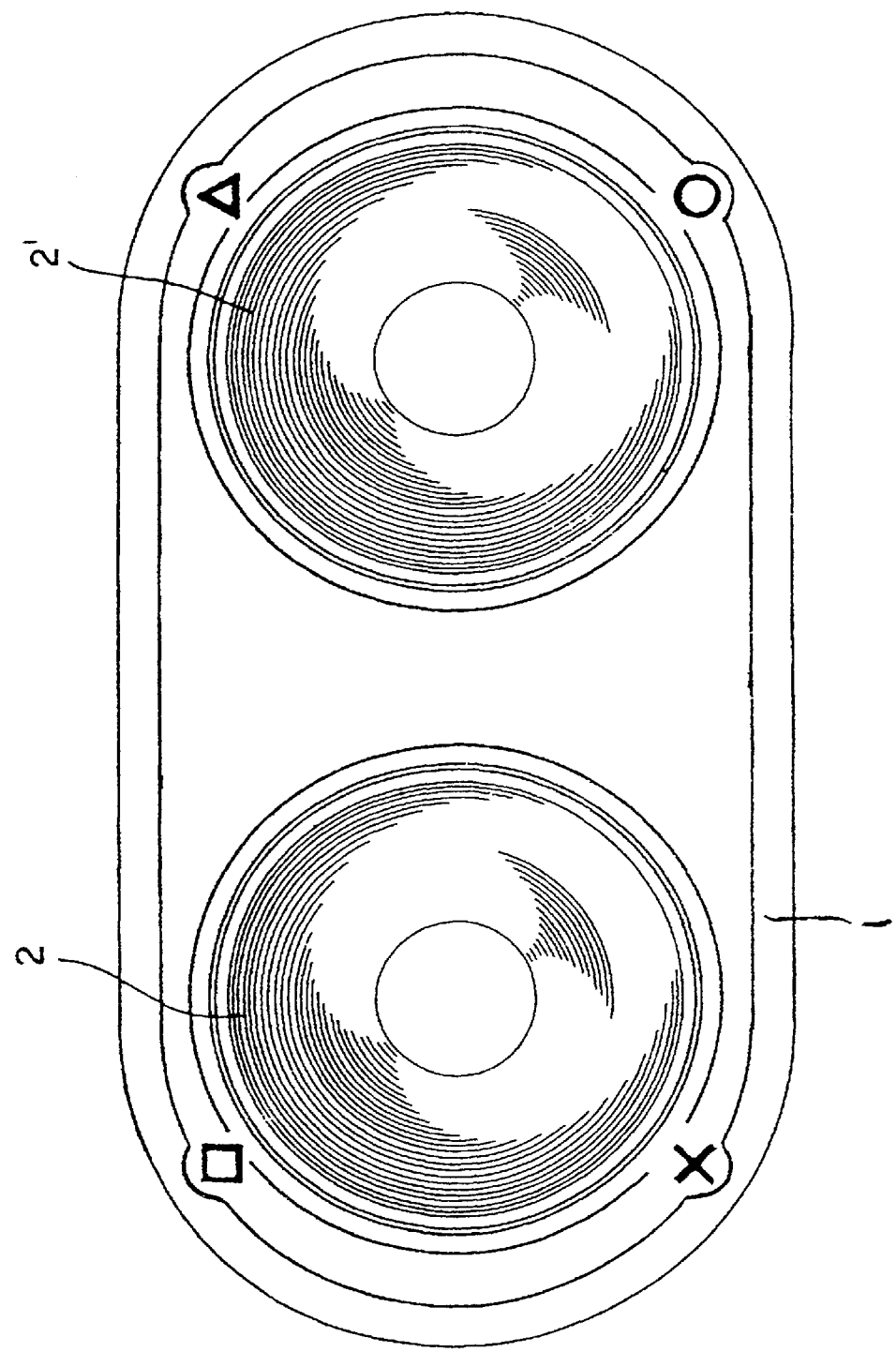
FIG. 1 is a front view of a controller for a game machine according to the present invention.

Referring to FIG. 1 showing a first embodiment of a controller for a game machine according to the present invention, a controller main body 1 is formed in an elliptical shape having two parallel sides. The controller main body 1 is positioned in a sideward elongated shape in use so that its longitudinal direction corresponds to right and left directions when a player holds the controller main body operating it. Two control plates 2 and 2' serving as switch operating parts are provided on the surface of the controller main body 1. The control plates 2 and 2' are formed in disk shapes similar to record disks and they have the same size and the same diameter.

Figure 2:
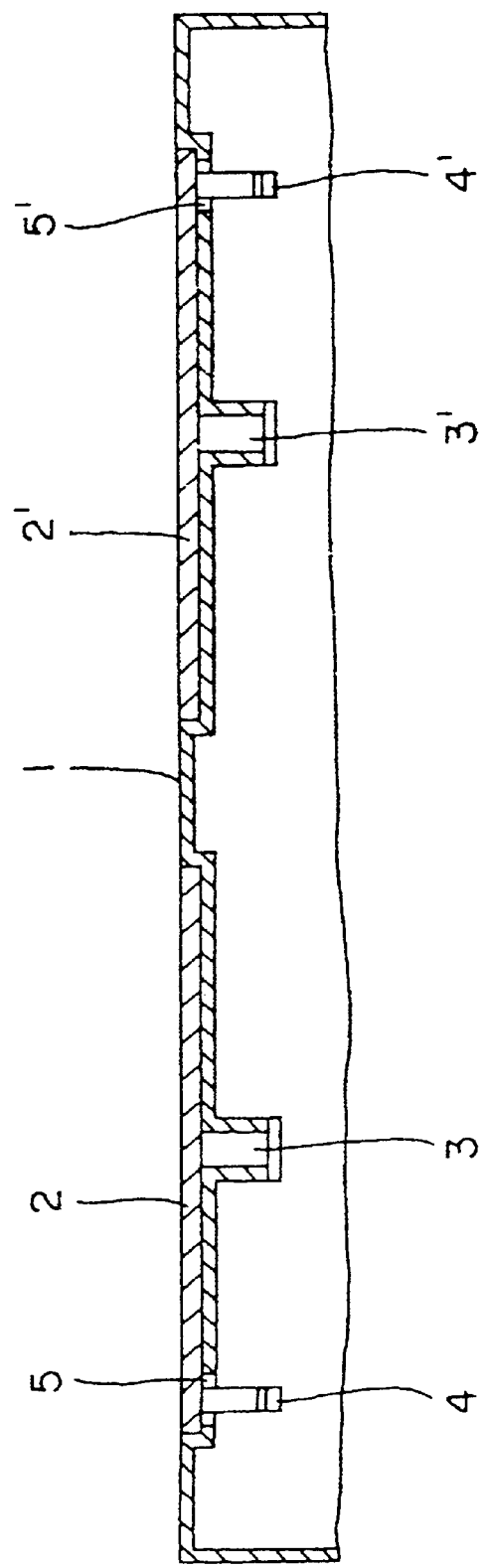
FIG. 2 is a sectional view of the controller for the game machine.

With reference to FIG. 2, rotation axes 3 and 3' are provided respectively on the centers on the back surfaces of the control plates 2 and 2', and pins 4 and 4' are fixed at positions different from those of the rotation axes 3 and 3' on the control plates. These members may be formed integrally with the control plates. The rotation axes 3 and 3' are fitted into holes formed in the controller main body 1. Consequently, the control plates 2 and 2' can freely rotate respectively on the rotation axes 3 and 3'.

Figure 3:
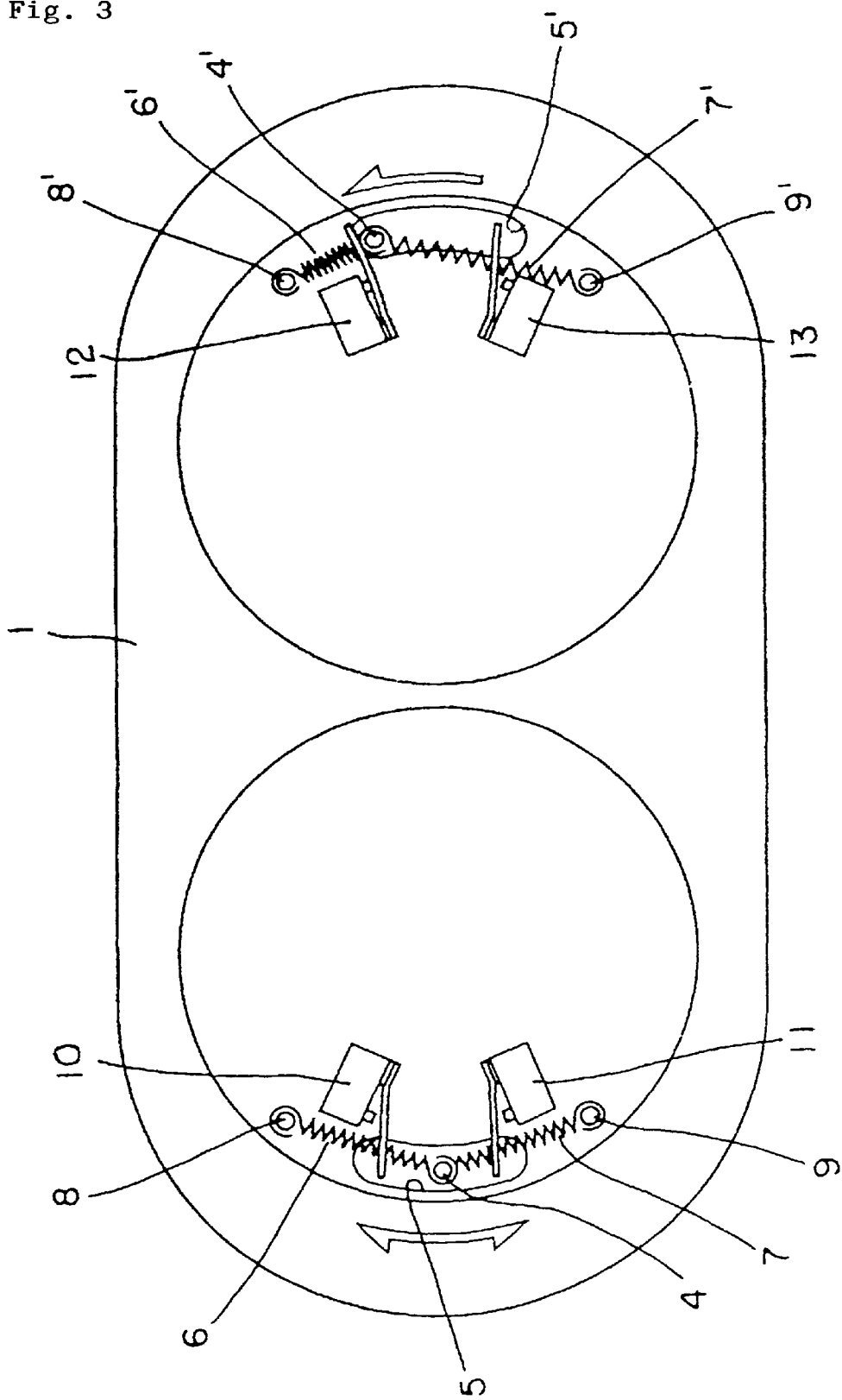
FIG. 3 is an explanatory view showing the inner part of the controller for the game machine shown in FIG. 1.

As shown in FIG. 3, the above described pins 4 and 4' are engaged with slots 5 and 5' formed in the controller main body 1. These slots 5 and 5' are formed with their longitudinal directions extending along circular arcs concentric with the control plates 2 and 2. The ranges of movement of the pins are limited within the slots, so that the maximum distances in which the control plates 2 and 2' can rotate are restricted. Further, respective one ends of two springs 6, 7 and 6', 7' are engaged with the pins 4 and 4' and the other ends of the springs 6, 7 and 6', 7' are engaged with engaging shafts 8, 9 and 8', 9' which are fixedly attached to the controller main body 1. In this case, the respective two springs have a substantially equal resilient force and the engaging shafts 8, 9 and 8', 9' are disposed at positions spaced by the same distance from the centers of the slots 5 and 5'. The two springs 6, 7 and 6', 7' respectively engaged with the pins 4 and 4' are formed as plate holding means for resiliently holding the control plates 2 and 2' according to the present embodiment at their neutral positions. In other words, for example, if a clockwise direction in FIG. 1 is regarded as a normally rotating direction, even when a player moves the control plates 2 and 2' in the normally rotating direction and in the direction opposite thereto, the control plates 2 and 2' are returned and held at their neutral positions because of the contraction action of the expanded springs due to the resilience of the two springs 6, 7 and 6' 7' when the player separates his hands from the control plates.

Further, as illustrated in FIG. 3, two switches are provided for each of the control plates 2 and 2' so that the total of four switches 10, 11 and 12, 13 are provided. These switches 10, 11 and 12, 13 are arranged respectively near the end parts of the slots 5 and 5' so that they can be turned on by the pins 4 and 4' when the control plates 2 and 2' rotate.

In the controller for a game machine constructed as mentioned above, since the control plates 2 and 2' are formed in disk shapes and these control plates are 2 and 2' rotated, a player can enjoy a game with a fresh sense of operation in a manner different from that of the conventional push-button type. In addition, since the control plates 2 and 2' are formed in shapes similar to record disks or the turntables of record players, the player can enjoy a game with a feeling like a disk jockey. Therefore, the controller for a game machine according to the present invention is most suitable for a controller of a game of the type that the switches are turned on/off to music.

Figure 4:
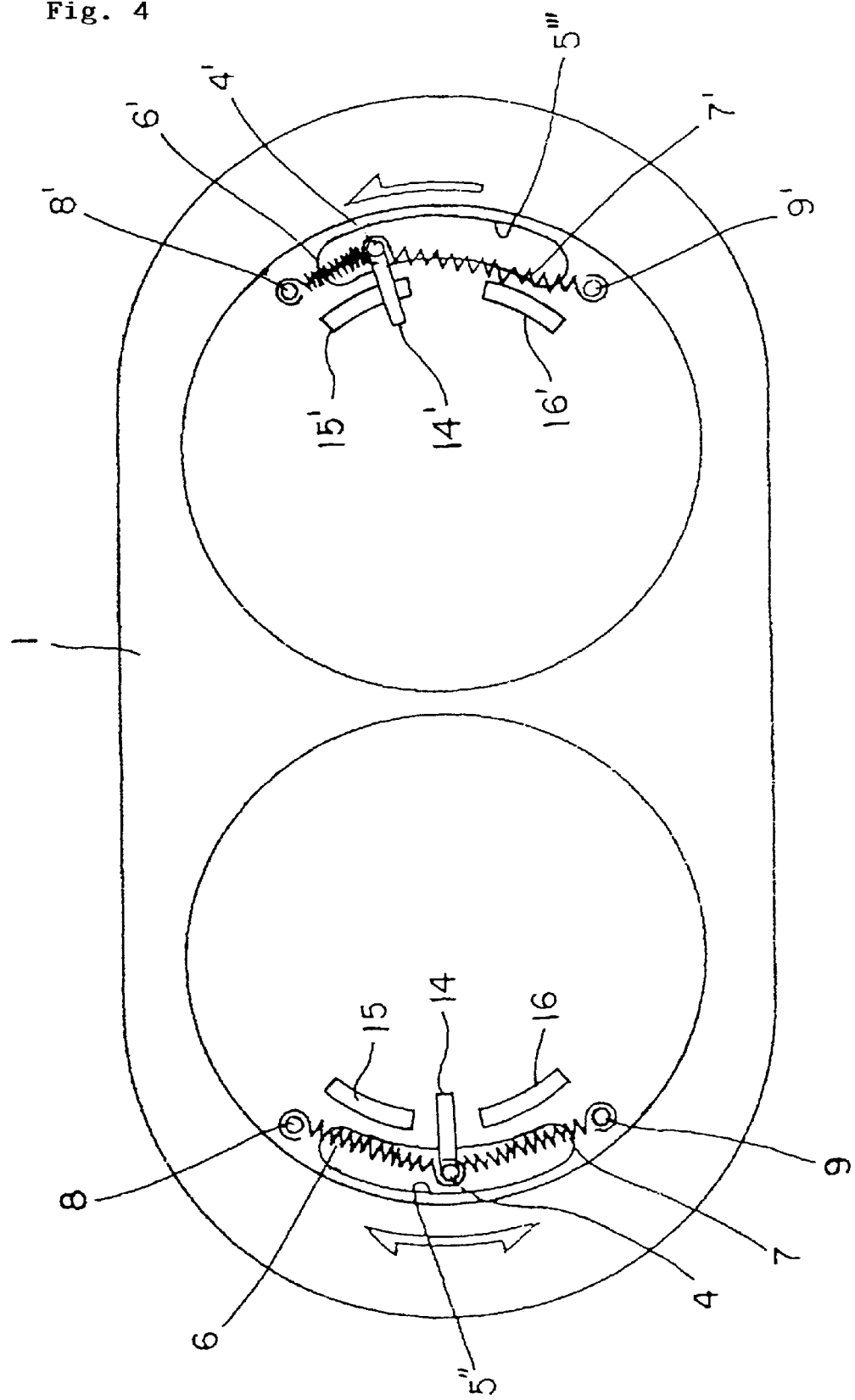
FIG. 4 is an explanatory view showing another inner construction of the controller for the game machine according to the present invention.

FIG. 4 shows a controller of another embodiment with an inner structure different from that of the above embodiment. While, in the above embodiment, the pins 4 and 4' abut on or are separated from the switches 10, 11 and 12, 13 to turn on or turn off the switches, contact shoes 14 and 14' attached to the side parts of pins 4 and 4', according to this embodiment, come into contact with contact plates 15, 16 and 15', 16' attached to a controller main body 1 to turn on switches and the contact state therebetween is cancelled so that the switches are turned off. Slots 5" and 5''' with which pins 4 and 4' are engaged are slightly longer than the slots 5 and 5' of the first embodiment. The slots are formed in slightly longer shapes in such a manner, hence the limitation of the movement of the pins 4 and 4' within the slots can be loosened. Further, it can be said the movement resistance of the pins only depends on the contraction operation of expanded springs and the expansion operation of contracted springs. Accordingly, timing for turning on/off the switches can be independent of the rotation limit of control plates, so that the player can obtain more a feeling like a disk jockey. Since other component parts in this embodiment are not different from those shown in FIG. 3, they are designated by the same reference numerals as those in FIG. 3 and the explanation thereof will be omitted.

The contact plate according to the above second embodiment may be divided into a plurality of fine pieces and the grades in a switch-on state may be established depending on how many of the fine contact pieces the contact members come into contact with. With such grades or intensity established, functions such as a sound volume button or a lighting button can be provided by rotating the control plates. Furthermore, the rotating operation of the control plates may be applied to the strength of swings in a baseball game or a golf game.

According to the above embodiments illustrated, since the springs are employed, they are designed to be returned to their neutral positions when the player separates his hands from the control plates. Alternatively a structure may have not springs so that the control plates can be rotated by an arbitrary amount in both clockwise or counterclockwise directions. At that time, a control for turning on/off the switches may be carried out by the contact between the fine contact pieces which are distributed with prescribed angular distances in the range of the entire periphery of the controller main body opposed to the control plates. Otherwise, photosensors may be provided in place of the above described fine contact pieces so that protrusions attached to the side surfaces of the pins traverse the photosensors. In the above described cases, the switches may be controlled so that they are not turned on/off until the number of times of contacts or the number of times of breaks reach a prescribed number of times.

According to the respective embodiments illustrated, the controller is provided only four switches. Most of controllers for ordinary domestic television game machines have six or more switches. Having four switches may not satisfy the number of switches desired. Therefore, FIGS. 5 to 8 show other embodiments in which the number of input operating parts is increased. The explanation thereof will be given successively hereinafter.

Figure 5:
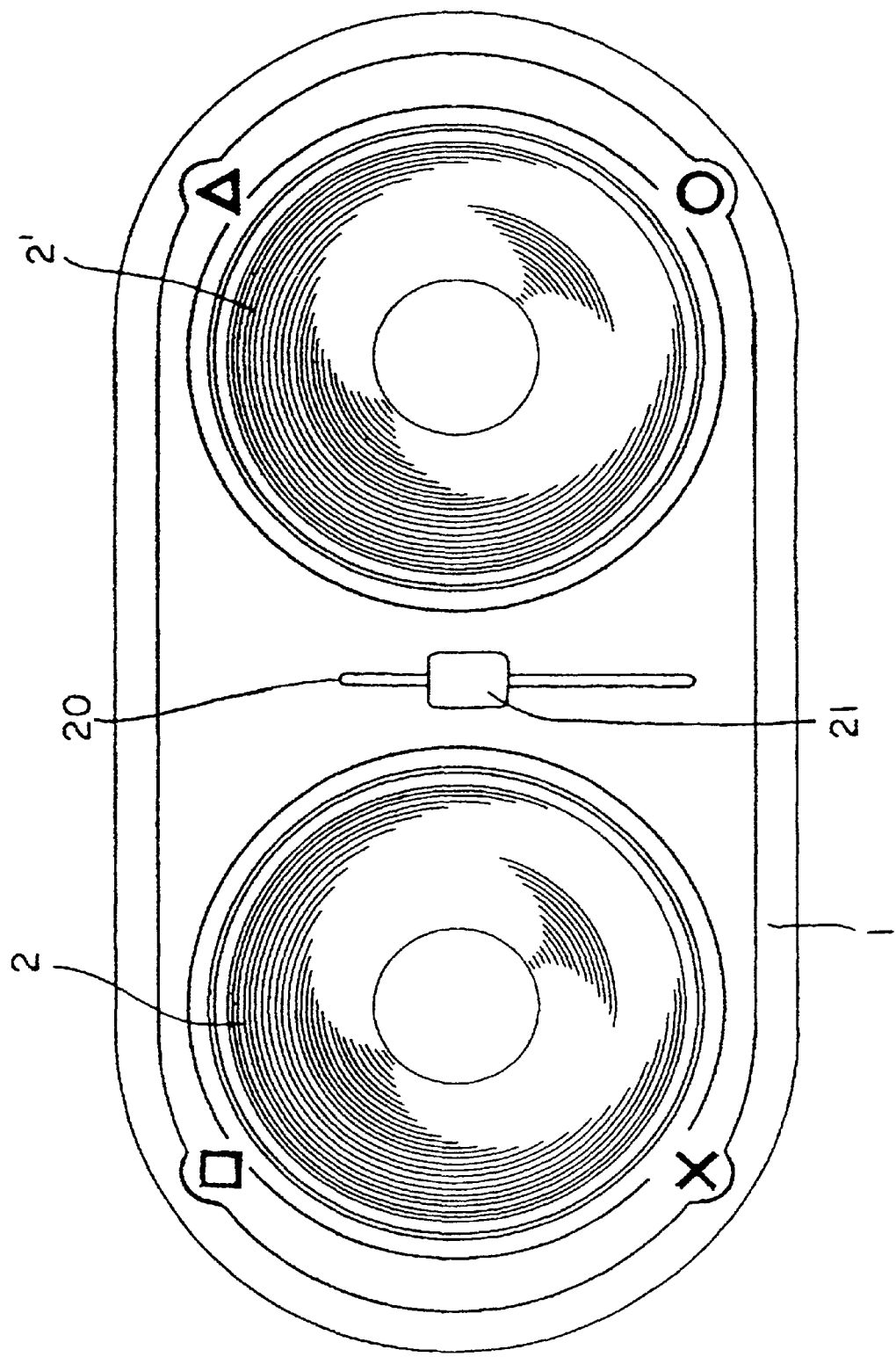
FIG. 5 is a front view showing another embodiment of a controller for a game machine according to the present invention.

In a controller for a game machine illustrated in FIG. 5, a slit 20 extending lengthwise is formed between control plates 2 and 2'. A slide button 21 which can slide in the slit 20 is provided. When the slide button 21 is moved toward an upper end and a lower end, one of two switches (not shown) different from the above described four switches which are provided in the controller main body 1 can be turned on. Prescribed functions may be strengthened or weakened based on the amount of sliding of the slide button 21 without turning on/off the two switches. At that time, the slide button 21 serves as a sliding member and a resistor in contact with the slide button 21 is assembled in the controller main body 1 to form a variable resistor. Since the constitution of the variable resistor is well-known, it is not described in detail.

Figure 6:
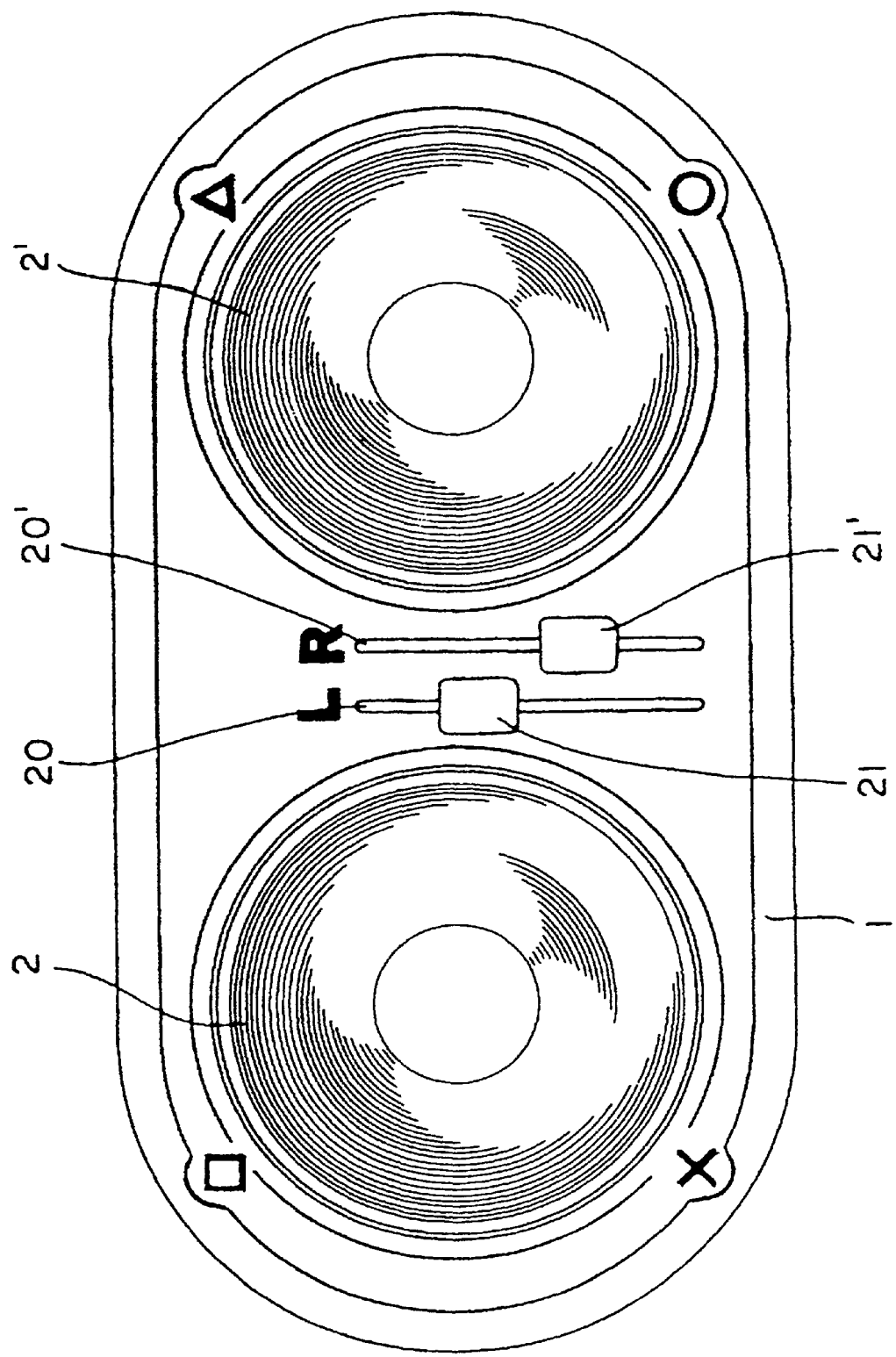
FIG. 6 is a front view of a still another embodiment of a controller for a game machine according to the present invention.

Further, in a controller for a game machine illustrated in FIG. 6, two slits 20 and 20' extending lengthwise are formed between control plates 2 and 2' and two slide buttons 21 and 21' capable of sliding respectively in the slits 20 and 20' are provided. When these slide buttons 21 and 21' are moved respectively toward an upper end or a lower end, any of four switches (not shown) in a controller main body 1 is turned on. It should be noted that a variable resistor may be formed as previously stated.

Figure 7:
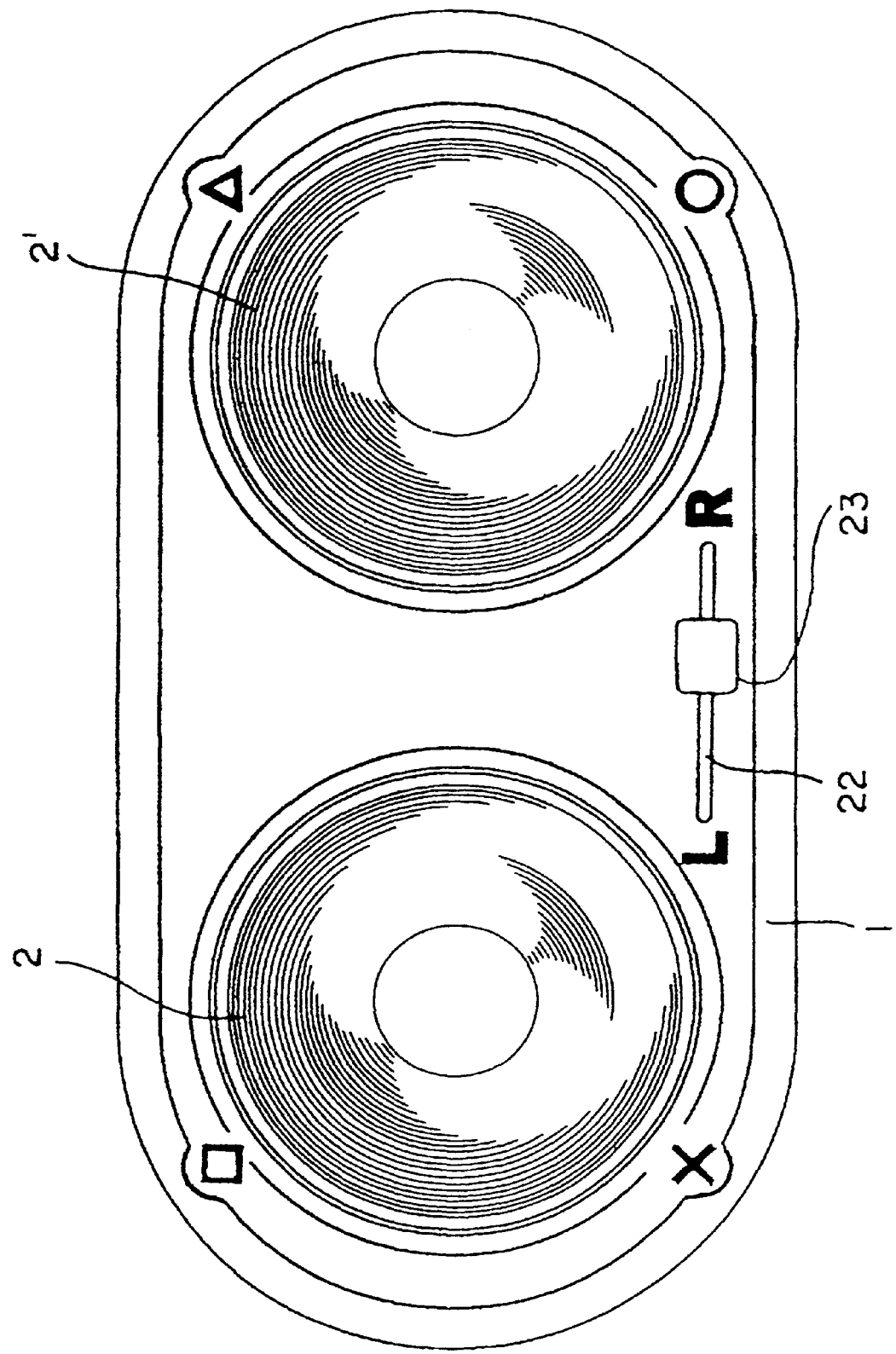
FIG. 7 is a front view of another embodiment of a controller for a game machine according to the present invention.

Still further, in a controller for a game machine illustrated in FIG. 7, a slit 22 extending sideways is formed below a region between control plates 2 and 2'. When a slide button 23 capable of sliding in the slit 22 is moved toward a right end and a left end, one of two switches (not shown) provided in a controller main body 1 is turned on. In this case, a plurality of the slide buttons 23 sliding sideways may be provided and these slide buttons 23 may be all provided below the region between the control plates 2 and 2' or they may be provided above and below the region between the control plates 2 and 2'.

Since the slide buttons provided in the controller are employed with a sense of a fade which is used by a disk jockey, a player can enjoy more of a feeling as if he were a disk jockey.

Figure 8:
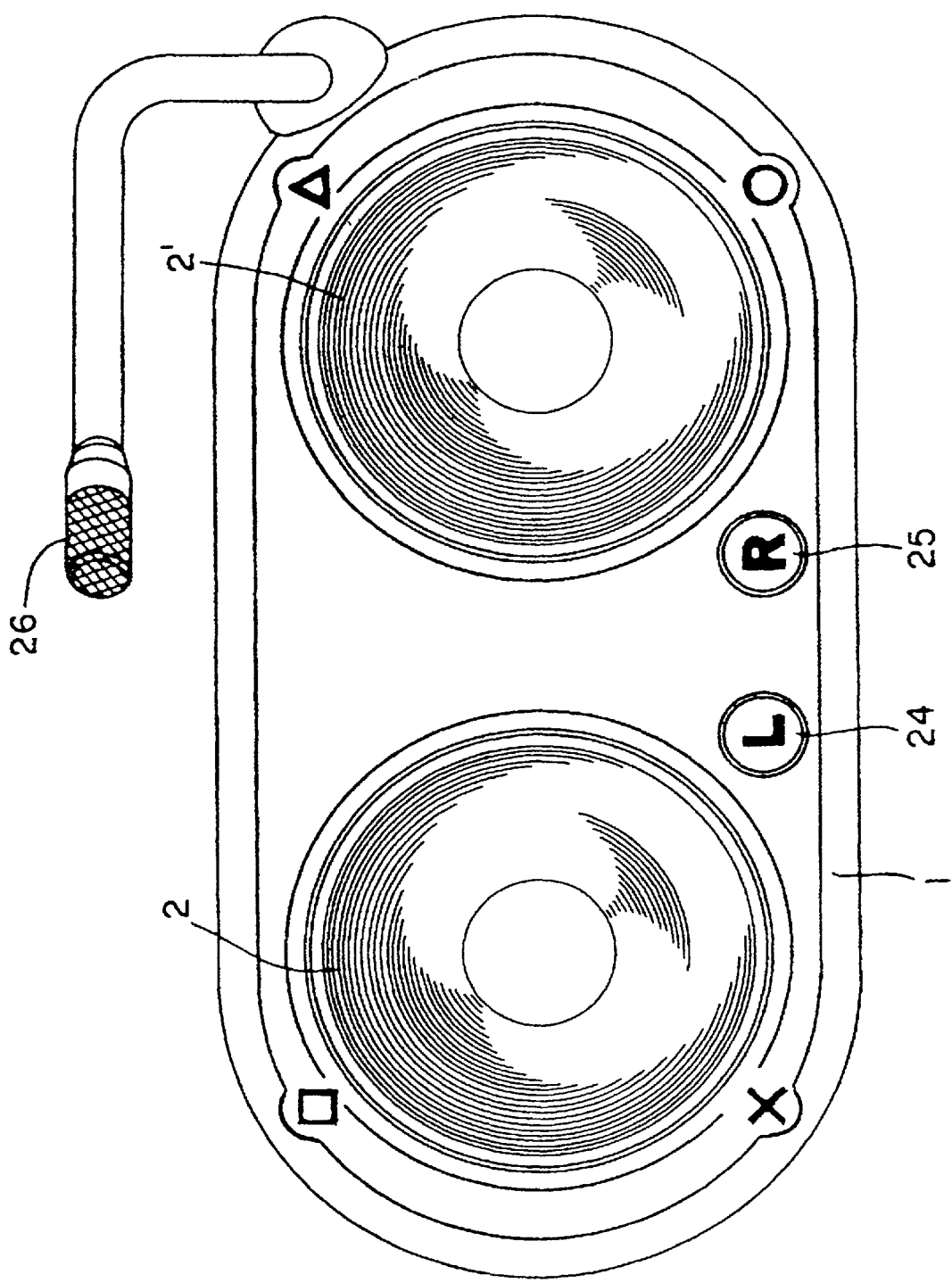
FIG. 8 is a front view of still another embodiment of a controller for a game machine according to the present invention.

Furthermore, in an alternative controller for a game machine shown in FIG. 8, two push-button switches 24 and 25 are provided below a part between control plates 2 and 2'. Besides, in this controller, a microphone 26 serving as a sound input means is also provided. Therefore, a player generates voice to this microphone so as to advance a game.

As apparent from the foregoing, the preferred embodiments of the present invention are described. It should be recognized that the present invention is not limited to the above embodiments. For instance, according to the above described embodiments, although the controller main body is formed in the elliptical shape having the two parallel sides, the plane configuration of the controller may be arbitrarily formed as long as the controller main body is formed in a shape such as an elliptical or rectangular shape, etc. in which at least one circular control plate (the two control plates are shown in the illustrated embodiments and three or more control plates may be sometimes formed) can be arranged.

In this connection, the controller according to the present invention is mainly connected to the game machine so that it is employed. It should be noted that the controller may be attached to the casing of the game machine and used as required.

[Effects of the Invention]

According to the present invention having the above described construction, the controller provides an operating method in which the two disks are rotated and operated, which has not heretofore been conventionally utilized. If this controller is used as a controller for a game in which the switches are turned on/off to music, the sensation of enjoyment of such a game can be maximized. Further, since the plate holding means are provided for holding the control plates at their neutral positions under resiliency, good operability can be obtained when the control plates automatically return to their neutral positions when the player releases the control plates even if they are normally and reversibly rotated.

What is claimed is:

1. A controller for a game machine having an input operating part to be operated by a player, said controller having a controller main body forming said input operating part, said controller main body comprising:
   i) at least one disk shaped control plate modeled on a turntable of a record player and mounted so as to be rotatable on a rotation axis substantially perpendicular to a surface of said controller body, and
   ii) a plate holding means for holding the control plate at a neutral position by resilient force, said control plate rotatable on the rotation axis so that prescribed switches are turned on or off.

2. A controller for a game machine according to claim 1, wherein said control plate reversibly rotates relative to the neutral position so that respectively different switches are turned on or off.

3. A controller for a game machine according to claim 2, wherein said controller main body is provided with at least two control plates which have the same size and the same shape and are arranged in parallel.

4. A controller for a game machine according to claim 1, wherein said controller main body is provided with at least two control plates which have the same size and the same shape and are arranged in parallel.

5. A controller for a game machine according to claim 1, wherein said switches are push-button type switches.

6. A controller for a game machine according to claim 1, wherein said switches are slide-contact type switches.

7. A controller for a game machine according to claim 6, wherein said switches are incremental switches.

8. A controller for a game machine according to claim 1, wherein said controller main body is provided with an operating member in addition to the control plate.

9. A controller for a game machine having an input operating part to be operated by a player, said controller having a controller main body forming said input operating part, said controller main body comprising: at least one disk shaped control plate modeled on a turntable of a record player and mounted so as to be rotatable on a rotation axis substantially perpendicular to a surface of said controller main body, said control plate rotating in either direction on the rotation axis so that prescribed switches are turned on or off.

10. A controller for a game machine according to claim 9, wherein said control plate rotates/reversibly rotates relative to the neutral position so that respectively different switches are turned on or off.

11. A controller for a game machine according to claim 10, wherein said controller main body is provided with at least two control plates which have the same size and the same shape and are arranged in parallel.

12. A controller for a game machine according to claim 9, wherein said controller main body is provided with at least two control plates which have the same size and the same shape and are arranged in parallel.

13. A controller for a game machine according to claim 9, wherein said switches are incremental switches.

14. A controller for a game machine according to claim 9, wherein said controller main body is provided with an operating member in addition to the control plate.

* * * * *